United States Patent Office 3,131,437
Patented May 5, 1964

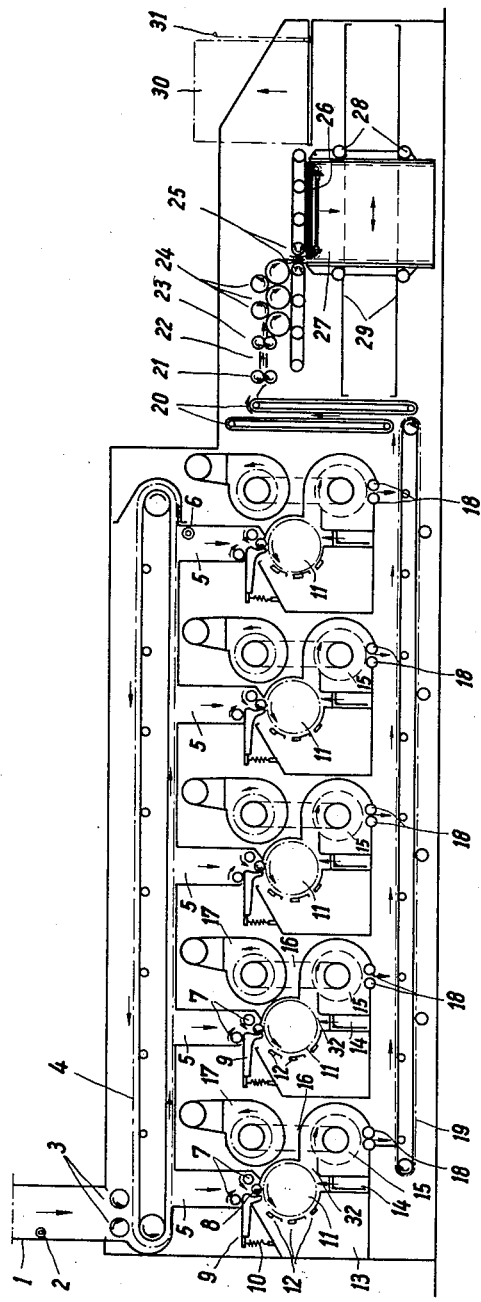

3,131,437
MACHINE FOR OPENING AND CLEANING COTTON AND FORMING A LAP THEREFROM
Erich Meinicke, Bruckner Allee 132, Rheydt, Germany
Filed June 14, 1961, Ser. No. 117,001
12 Claims. (Cl. 19—156.4)

This invention relates to a machine for opening and cleaning cotton and for delivering it in the form of a lap.

In the preparation of cotton for spinning, before a sliver is formed on the carding engine, the cotton is passed consecutively through a number of machines which bring it into condition for carding. In these machines the cotton which is received in the form of compressed bales must first be opened, cleaned and formed into a uniform lap. Generally the cotton is broken down into tufts by, for example, four bale breakers working in parallel and the tufts from the several bales are mixed. These tufts are fed consecutively to, for example, to a multipoint cleaner and to a sequence of machines which in succession comprise one or several hopper feeders, a multipoint cleaner and an opener and cleaner. The cotton tufts are then taken to another sequence of machines comprising one or several hopper feeders and a beater which breaks up and loosens matted lumps of cotton. The resultant lap is finally rolled and thus delivered to the carding engine. Since the production rate of the carding engine upon which the irregular cotton fibres are straightened is very much lower than the output rate of the openers and beaters, the preparation of the cotton calls for the provision of a large number of machines. A conventional plant may therefore comprise the following machines: 4 bale breakers, one possibly serving as a waste opener, a multipoint cleaner, a hopper feeder, a second multipoint cleaner, a double opener and cleaner, followed by two parallel sequences of machines, each comprising a double bin hopper feeder, a beater, a lap winding machine and a total of 60 cards, 30 cards for each lapper.

It is the object of the present invention to reduce the number of machines required in such a plant. The invention therefore relates to a machine for interposition between the bale breakers and carding engines. The machine proposed by the invention comprises a plurality of sawtooth striker cylinders operating in parallel, each cylinder being fed from a feeder shaft by feed rollers and being associated with deflector blades, and each cooperating with a following rotating dust cage associated with a pair of delivery rollers. The feeder shafts of the several assemblies are supplied with the cotton by a common flight conveyor distributor, or the like, and the several assemblies deliver the cotton onto a common delivery lattice upon which the pairs of delivery rollers associated with each assembly consecutively deposit and superimpose the fibre webs that have been formed.

Some of these features are already known to the art. For instance, machines for opening and cleaning cotton are already known in which several saw-tooth cylinders cooperating with deflector blades are located in parallel and fed from a common storage chamber, the cleaned cotton fibre being pneumatically delivered into a common trunk. In blending devices it is known to use several parallel hoppers from which the cotton is deposited by a pair of delivery rollers in the form of fibre fleeces on a common high speed delivery lattice which by the action of its spikes again opens up the fibre fleeces into individual tufts. However, in these devices which are already known to the art the combination of features proposed by the present invention is absent. Moreover, these earlier devices also serve other purposes.

The proposed machine is preferably arranged to cooperate with means for drafting and condensing the lap, as well as with a device for depositing the lap under compression in layers in a receiving bin.

The proposed machine opens and cleans the cotton in a satisfactory manner besides sufficiently straightening the fibre to relieve the card of much of this work. Consequently the carding engines can be driven at much higher speeds with a resultant substantial improvement in the rate of production which can be achieved with the same number of cards.

The general lay-out of a machine according to the present invention is schematically and illustratively shown in the accompanying drawing wherein the sole figure diagrammatically represents a preferred embodiment.

The machine comprises five striker cylinders 11 armed with saw-teeth. A feeding chute 5 is located above each of these cylinders. The feed chutes 5 are supplied by a flight conveyor distributor in the form of a spiked feed lattice 4 receiving the cotton from a feed trunk 1. Arranged in parallel with each saw-tooth striker cylinder 11 is a rotating dust cage 15 consisting of a shell in the form of a grid. The interior of each dust cage 15 is connected by a suction pipe 16 with an extractor fan 17. Below each cage 15 is a pair of delivery rollers 18 and underneath the several pairs of delivery rollers 18 is a delivery lattice 19 which is common to all the assemblies 5, 7, 8, 11, 12, 15 and 18. This part of the machine functions as follows: The cotton from the bale breaker is discharged in a continuous stream by conveyor means into the feed trunk 1. The latter is equipped with a photocell 2 exposed to a shaft of light from a lamp. The photocell 2 controls switch means which stops a preceding conveyor means, not shown in the drawing, when feed trunk 1 has ben filled to a level covering the photocell 2, and which restarts the conveyor when the feed rollers 3 in the feed trunk 1 have sufficiently emptied the feed trunk 1 to uncover photocell 2.

The feed rollers 3 compress the tufts into a fleece and slowly deliver the same to lattice 4. The spikes on the bottom strand of this lattice, which travels at a fairly high speed, continuously detach tufts from the fibre mass and discharge them into the several feeding chutes 5. The feeding chute 5 which is furthest to the left in the drawing is thus filled first, followed consecutively by the several shafts situated further to the right in the drawing. The last feeding chute 5 on the right hand side in the drawing is equipped with a photocell 6 exposed to a shaft of light from a lamp not shown. As soon as the cotton which drops into this latter feeding chute 5 covers photocell 6, switch means stop feed lattice 4 and feed rollers 3. The lattice 4 and feed roller 3 are not started again until the column of tufts in the last feeding chute 5 has again uncovered photocell 6.

The cotton tufts in each feed chute 5 are delivered to each sawtooth cylinder 11 by two continuously driven feed rollers 7 and a feed roll 8 which cooperates with a concave feed pedal 9. Between the feed roll 8 and the feed pedal 9, which is a device already known to the art, the cotton tufts are compressed and slowly delivered to the associated saw-tooth cylinder 11. In conventional manner, the feed pedal 9 is a two-armed lever the arm which, remote from the concave portion thereof, is loaded by a spring 10 which urges the feed pedal 9 towards the feed roll 8. This known feed roll device ensures a constant flow of tufts to the saw-tooth cylinder 11.

The diameter of the saw-tooth cylinder 11 may be 400 mm., its length about 1000 mm. and its speed of rotation in the direction shown by the arrows between 500 and 1000 r.p.m. As the saw-tooth cylinder 11 rotates, its saw-tooth striker blades continuously remove small tufts of fibre out of the fibre mass presented to it by the feed roll 8, and a thin web of fibres is thus carried away from the feed roll 8 on the periphery of the saw-tooth cylinder 11. Owing to the high peripheral speed of the saw-tooth cylinder 11, dirt which is heavier than the cotton fibre is ejected radially outwards by centrifugal force. Located around the periphery of the cylinder 11 are three deflector blades 12 which intercept the ejected dirt and deflect the same over the outside surfaces into a dirt chamber 13. This action thoroughly cleans the cotton besides very considerably straightening the fibre. Behind the third deflector blade 12 the fibre web enters a chamber 32 where it is detached from the cylinder 11 by centrifugal force. The freed fibre leaving cylinder 11 is drawn onto the cage 15 by suction and then stripped from the cage by a pair of delivery rollers 18. Chamber 32 communicates through a duct 14 with the ambient air, permitting the fan to draw in air from chamber 32 through the surface of the cage 15 into the interior thereof. The air flow is therefore substantially codirectional with the path of the fibres which detach themselves from the saw-tooth cylinder 11 and fly on to the surface of the cage 15, the peripheral speed of which is substantially less than that of cylinder 11. While the fibre is on the cage 15 any remaining impurities are removed from the fibre while the same is concurrently consolidated by the air suction effect. Further consolidation is effected by the pressure of the pair of delivery rollers 18 which are placed appropriately closely together.

The fibre webs from the pairs of delivery rollers 18 are deposited in superimposed layers on the delivery lattice 19 and form a thick lap weighing about $5 \times 110 = 550$ g./sq. m.

The delivery lattice 19 conveys the lap to a vertical conveyor consisting of two revolving lattices 20 between which the lap is conveyed in the upward direction. Following this conveyor, two pairs of cylinders 21 and 23 are arranged in tandem with a testing device 22 between them for measuring the weight of fibre strands. The particular device may be a "Uster" tester wherein strands pass between capacitor plates wherein the dielectric constant of the media between the plates is modified by the strands and depends on the mass of interposed fibres. Behind the last pair of cylinders 23 are several calender rollers 24. These rollers revolve at a peripheral speed which may be 30% faster than the peripheral speed of the preceding pair of cylinders 23, so that the lap is subjected to a 30% draft between cylinders 23 and calender rollers 24. The speed of the calender rollers is controllably variable for adjusting the draft. Control may be automatic, for instance to produce a lap of uniform weight. A 30% draft has been found a good average but the draft may vary between 10% and about 40% or even more to produce a lap of uniform weight. Another function of the calender rollers 24 is to subject the lap to considerable pressure to prevent its deformation during subsequent treatment.

The lap leaving the calender rollers 24 is deposited in a bin 27 in superimposed folded layers. To this end, the floor 26 of bin 27 can be raised to the edge of the bin and lowered in controllable manner. Bin 27 is mounted on rollers 28 which ride on horizontal rails 29. Immediately above the bin 27 are two horizontally abutting counter-rotating conveyor lattices 25 which together form a lap depositing means. The lap leaving the calender rollers 24 is conveyed to the floor 26 of bin 27 between the two lattices 25 while at the same time the bin 27 is reciprocated on its rails 29 through a distance which corresponds with its width. The lap is therefore deposited on the floor 26 in a succession of folded layers, the floor 26 compressing the lap against the underside of the lattice 25. As the bin 27 slowly fills, the floor is gradually lowered until the entire bin is filled with closely packed layers. The bin is then moved either by an operator or automatically on its rails 29 underneath a transfer bin 30 which is closed at the top, whereas its bottom can be slidably opened and then pivoted into a vertical position. The bottom 31 having been opened, the contents of bin 27 are pushed into the transfer bin 30 by raising the floor 26 of bin 27. The bottom 31 is then pivoted to a horiontal position and slidably closed. Transfer bin 30 is then taken either manually or by a lifting device to the carding machine. It should be noted that generally a plurality of empty transfer bins are available with at least one of them operatively positioned on the machine. While the contents of bin 27 are pushed into transfer bin 30 the machine continues operating and only a small length of fibre strand is produced which simply falls on the raised floor 26 while bin 27 is returned to its operative position. It will be readily understood that transfer bin 30 will now contain a length of lap which is several times that conventionally comprised in a rolled lap. The lap deposited in layers inside the bin 30 has the advantage over a rolled lap of being completely uniform throughout its length.

I claim:

1. A machine for opening and cleaning a fibrous material from a source of the material and for delivering the material in the form of a lap comprising: a plurality of material processing means disposed in a row, each including a feeding chute for accepting the fibrous material and having an inlet and an outlet, a pair of driven feed rollers disposed near the outlet in each said feeding chute for delivering the fibrous material from said feeding chute, a rotatable saw-tooth striker cylinder disposed opposite said driven feed rollers for ripping tufts of the fibrous material delivered by said feed rollers, a rotatably driven cylindrical cage means operatively associated with said striker cylinder, suction means for sucking the fibrous material on said striker cylinder onto said rotatable cylindrical cage means, and driven delivery rollers disposed below said rotatable cylindrical cage means for delivering the material on said rotatable cylindrical cage means in the form of a lap; a common input delivery conveyor means disposed over the row of said processing means for simultaneously delivering the material from said source to the inlet of the feeding chute of each of the material processing means; and a common output delivery conveyor means disposed under the delivery rollers of each of said processing means to receive the laps formed by said delivery rollers.

2. The machine as claimed in claim 1, in which the peripheral speed of said rotatably driven cylindrical cage means is substantially less than that of the saw-tooth striker cylinder.

3. The machine as claimed in claim 1, in which the delivery rollers are placed sufficiently closely together to squeeze and compress the fibrous material into a lap.

4. The machine as claimed in claim 1, in which each processing means further includes a duct for the admission of air drawn by said suction means through said cylindrical cage means, said duct comprising a zone along which the air stream can carry the fibrous material from said saw-tooth striker cylinder to the surface of said cylindrical cage means.

5. The machine as claimed in claim 1, wherein the common input conveyor means is a lattice for conveying the fibrous material from said source to the inlet of each of said feeding chutes in succession.

6. The machine as claimed in claim 1, wherein the feeding chute last served by said common input delivery conveyor means includes means for stopping said common input delivery conveyor means when said last feeding chute has been filled to a given level.

7. The machine as claimed in claim 1, further including driven calender rollers operatively disposed with respect to said output delivery conveyor means for receiving laps therefrom for compressing the same.

8. The machine as claimed in claim 7 further including a pair of cylinders operatively disposed between said calender rollers and said output delivery conveyor means and located at a distance from said calender rollers which exceeds the staple length of the fibrous material, said calender rollers being driven at a higher peripheral speed than said pair of cylinders.

9. The machine as claimed in claim 1, further including a bin operatively disposed with respect to said output delivery conveyor means and means to enable a reciprocating driving of said bin whereby the bin receives the laps in folded consecutive layers.

10. The machine as claimed in claim 1, further including calender rollers for compressing the laps delivered by said output delivery conveyor means, a bin, adapted for being reciprocatingly driven, and depositing means for delivering the compressed laps into said bin, wherein they are folded in consecutive layers.

11. The machine as claimed in claim 10, wherein said depositing means comprise two endwise abutting contrarotating endless conveyors located in the plane of the upper edge of said bin for feeding the compressed laps into said bin between their abutting edges.

12. The machine as claimed in claim 10, wherein said bin includes a floor which is raisable into close adjacence with the top edge of said bin and lowerable in ratio with the deposition of layers of laps for compressing said layers.

References Cited in the file of this patent

UNITED STATES PATENTS

| | | |
|---|---|---|
| 307,119 | Keene | Oct. 28, 1884 |
| 520,285 | Zedler | May 22, 1894 |
| 1,117,567 | Harriss | Nov. 17, 1914 |
| 2,500,819 | Hall et al. | Mar. 14, 1950 |
| 2,712,675 | Gwaltney et al. | July 12, 1955 |
| 2,827,667 | Moss | Mar. 25, 1958 |